United States Patent

Nakanishi

[11] Patent Number: 5,818,561
[45] Date of Patent: Oct. 6, 1998

[54] LIQUID CRYSTAL DISPLAY DRIVER IC WITH OUTPUT CONNECTION LEADS DIRECTLY MOUNTED ON A LIQUID CRYSTAL SUBSTRATE AND INPUT CONNECTION LEADS MOUNTED TO ANOTHER SUBSTRATE

[75] Inventor: Futoshi Nakanishi, Tokyo, Japan

[73] Assignee: NEC Corporation, Tokyo, Japan

[21] Appl. No.: 767,847

[22] Filed: Dec. 17, 1996

[30] Foreign Application Priority Data

Dec. 27, 1995 [JP] Japan ................................. 7-341641

[51] Int. Cl.⁶ ........................ G02F 1/1345; H01L 23/495
[52] U.S. Cl. ...................... 349/149; 349/150; 349/151; 349/152; 257/666; 257/668
[58] Field of Search .................................. 349/149, 150, 349/151, 152; 257/666, 668, 672, 676; 174/254, 255; 361/772

[56] References Cited

U.S. PATENT DOCUMENTS 5,448,387  9/1995  Kurokawa et al. ..................... 257/668
5,528,403  6/1996  Kawaguchi et al. .................... 349/149
5,621,554  4/1997  Kuniyori ................................. 349/149

Primary Examiner—William L. Sikes
Assistant Examiner—Walter Malinowski
Attorney, Agent, or Firm—Sughrue, Mion, Zinn, Macpeak & Seas, PLLC

[57] ABSTRACT

A liquid crystal display (LCD) having a liquid crystal (LC) panel including a glass substrate, and an IC (Integrated Circuit) chip having input connection terminals and output connection terminals and mounted on the glass substrate. The output connection terminals are connected to an output conductive pattern formed on the glass substrate. The input connection terminals are connected to a connection substrate. The LCD therefore does not need an input conductive pattern customarily formed on the glass substrate. This insures the feed of signals to the IC chip and reduces the frame area of the glass substrate.

2 Claims, 3 Drawing Sheets ic # LIQUID CRYSTAL DISPLAY DRIVER IC WITH OUTPUT CONNECTION LEADS DIRECTLY MOUNTED ON A LIQUID CRYSTAL SUBSTRATE AND INPUT CONNECTION LEADS MOUNTED TO ANOTHER SUBSTRATE

BACKGROUND OF THE INVENTION

The present invention relates to a liquid crystal display (LCD) and, more particularly, to an LCD for solving a problem ascribable to a high resistance wiring formed on a glass substrate, and reducing the frame size of the glass substrate to thereby implement a large size multi-frame panel.

A conventional COG (Chip On Glass) mounting type LCD includes a liquid crystal (LC) panel having a glass substrate.

An input conductive pattern and an output conductive pattern are formed on the LC panel. An IC (Integrated Circuit) chip is affixed to the LC panel with its input connection terminals and output connection terminals lying on the input conductive pattern and output conductive pattern, respectively. A flexible printed circuit (FPC) board is connected to the input conductive pattern. The problem with the conventional LCD is that the LC panel needs a frame area great enough to accommodate the IC chip and FPC board. This undesirably increases the dimensions of the panel. Japanese Patent Laid-Open Publication Nos. 5-100242 and 4-180030, for example, each proposes a particular solution to the above problem.

However, the conventional implementations have some problems yet to be solved, as follows. An input signal is fed to the IC chip via the input conductive pattern or wiring formed on the glass substrate. Because this conductive pattern is implemented as a thin film having high line resistance, it is difficult to feed an input signal stably to the COG type IC chip. Further, the frame area of the LC panel for mounting the the IC chip is greater than the area of the chip, and cannot be reduced beyond a certain limit. This is undesirable for a large size multi-frame glass substrate layout. Moreover, the cost is apt to increase due to a great number of constituent parts and a great number of production steps. This is ascribable to the use of the FPC board which is apt to be expensive.

SUMMARY OF THE INVENTION

It is an object of the present invention to eliminate the problems particular to the conventional LCDs as discussed above.

In accordance with the present invention, in an LCD having an LC panel including a glass substrate, and an IC chip having input connection terminals and output connection terminals and mounted on the glass substrate, the output connection terminals are directly mounted on the glass substrate while the input connection terminals are connected to a connection substrate. The IC chip bridges the glass substrate and connection substrate.

Also, in accordance with the present invention, in an LCD of the type described, the output connection terminals are directly mounted on the glass substrate while the input connection terminals are connected to a TAB (Tape Automated Bonding. The TAB tape is connected to a connection substrate.

The IC chip bridges the glass substrate and TAB tape.

BRIEF DESCRIPTION OF THE DRAWINGS

The above and other objects, features and advantages of the present invention will become apparent from the following detailed description taken with the accompanying drawings in which.

In the figures, identical reference numerals denote identical structural elements.

DESCRIPTION OF THE PREFERRED EMBODIMENTS

Figure 1A:
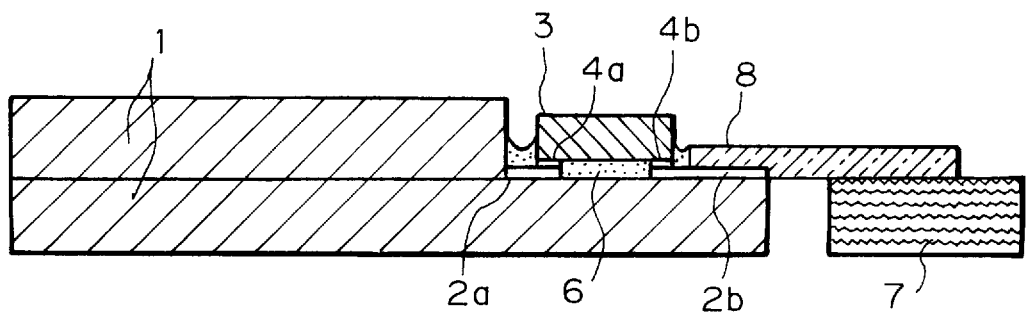
FIG. 1A is a section showing a conventional COG type LCD.
Figure 1B:
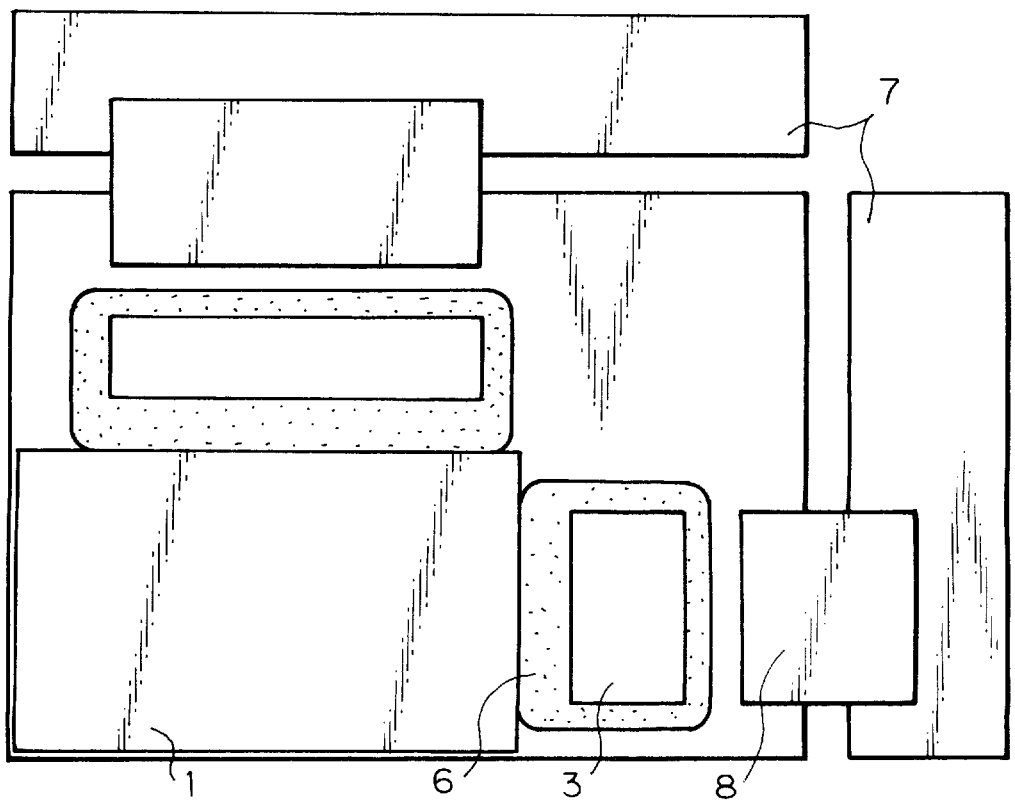
FIG. 1B is a plan view of the conventional LCD.

To better understand the present invention, a brief reference will be made to a conventional LCD using the COG scheme, shown in FIG. 1A and 1B. As shown, the LCD includes an LC panel 1, an output conductive pattern 2a, and an input conductive pattern 2b. An IC chip 3 has output connection terminals 4a and input connection terminals 4b. The IC chip 3 is mounted to the panel 1 face down with its connection terminals 4a and 4b aligning with the conductive patterns 2a and 2b, respectively. The IC chip 3 is affixed to the panel 1 by adhesive 6. Subsequently, an FPC board 8 is connected to the surface of the input conductive pattern 2b on which the input connection terminals 4b of the chip lie. The FPC board 8 is electrically connected to the connection terminals 4b via the conductive pattern 2b provided on the panel 1. The reference numeral 7 designates a connection substrate.

The problem with the above LCD configuration is that the LCD panel 1 needs a frame area great enough to accommodate the IC chip 3 and FPC board 8. This undesirably increases the dimensions of the panel 1. Although previously mentioned Japanese Patent Laid-Open Publication Nos. 5-100242 and 4-180030 propose solutions to such a problem, they have the problems discussed earlier.

Figure 2A:
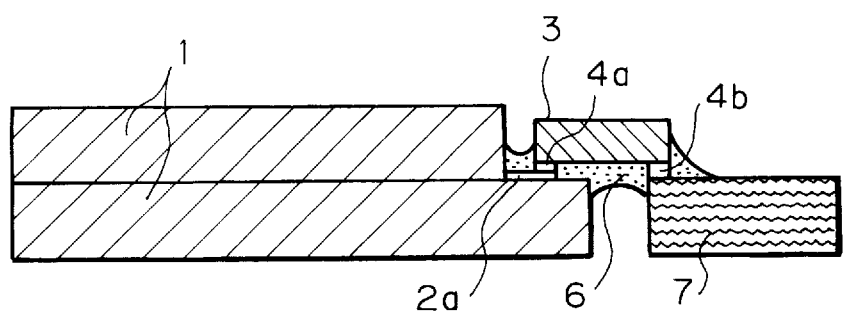
FIG. 2A is a section showing an LCD embodying the present invention.
Figure 2B:
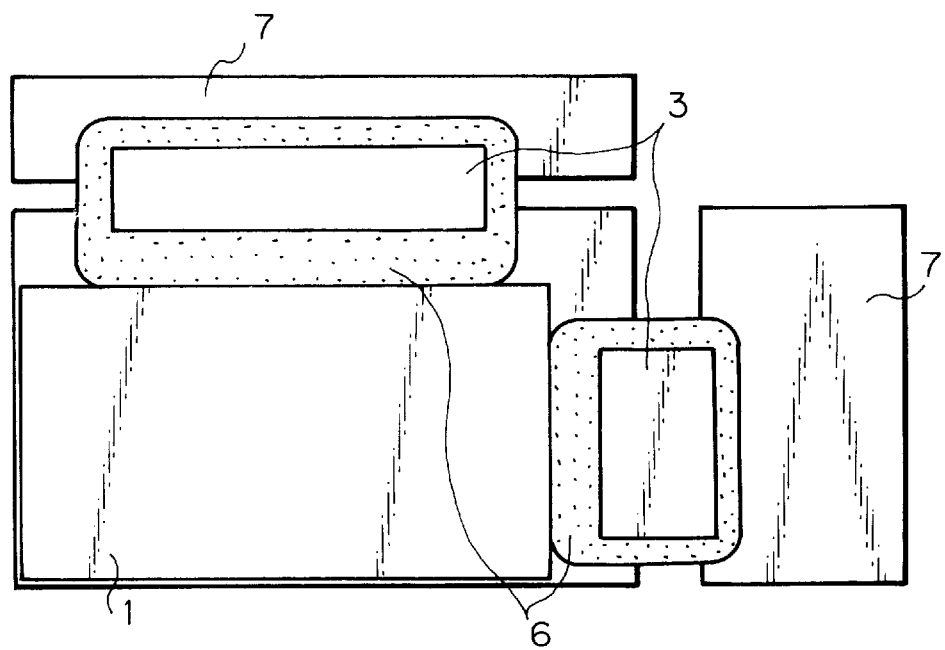
FIG. 2B is a plan view of the embodiment shown in FIG. 2A.

Referring to FIGS. 2A and 2B, an LCD embodying the present invention will be described. As shown, the LCD includes an LC panel or glass substrate 1. An IC chip 3 has output connection terminals 4a and input connection terminals 4b. The connection terminals 4a and 4b are respectively positioned on an output conductive pattern 2a formed on the glass substrate 1 and a connection substrate 7. The IC chip 3 therefore bridges the glass substrate 1 and connection substrate 7. In this condition, the chip 3 is affixed to the two substrates 1 and 7 by adhesive 6.

The input connection terminals 4b of the chip 3 are formed of, e.g., gold while the connection substrate 7 is formed of, e.g., epoxy resin. A wiring formed on the substrate 7 is formed of copper, but its portions contacting the above connection terminals 4b are formed of gold. With this configuration, intermetallic bond can be expected. This, coupled with the fact that the wiring for feeding an input signal has low resistance, insures electrically stable connection. Further, the chip 3 is connected to the substrates 1 and 7 by the adhesive 6. If the gap between the glass substrate 1 and the connection substrate 7 is controlled in matching relation to the viscosity of the adhesive 6 at the time of setting, the adhesive 6 penetrates into the gap due to capillarity and forms a fillet. The fillet increases the adhesion area, compared to the case wherein an IC chip is mounted on a flat surface. As a result, the IC chip 3 can be firmly adhered and held in stable electrical connection. Such a configuration saves the frame area of the LCD panel 1 by about 50%. To control the gap between the substrates 1 and 7, a lug may be formed on the end of the substrate 7 facing the substrate 1.

Figure 3A:
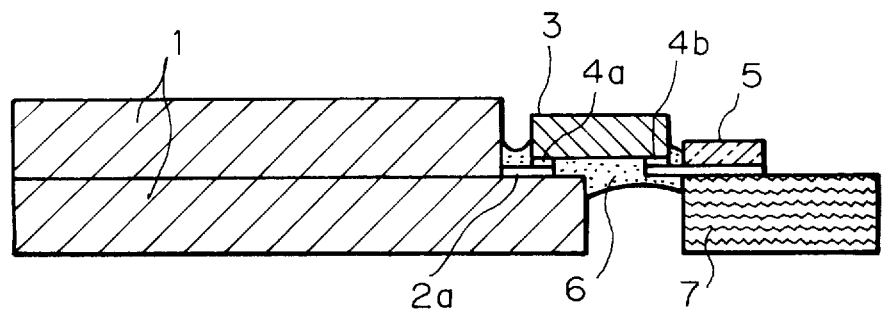
FIG. 3A is a section showing an alternative embodiment of the present invention.
Figure 3B:
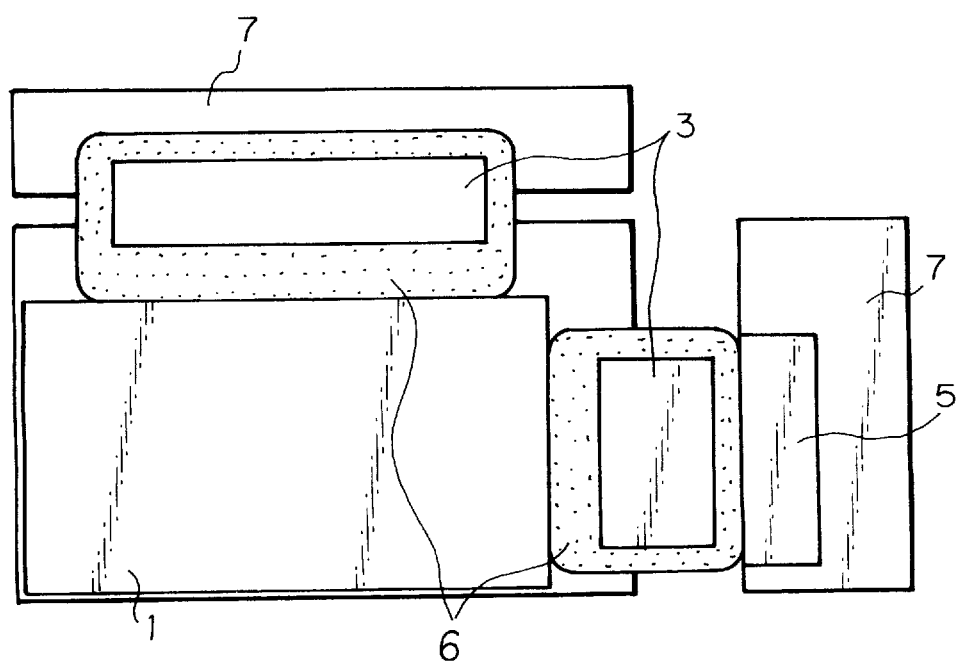
FIG. 3B is a plan view of the alternative embodiment.

An alternative embodiment of the present invention will be described with reference to FIGS. 3A and 3B. In this embodiment, the IC chip 3 is of the type originally adapted for a TCP (Tape Carrier Package). As shown, the chip 3 has its input connection terminals 4b connected to a TAB tape 5. The output connection terminals 4a are configured in the same manner as in the previous embodiment. The TAB tape 5 needs only about one-half of an area particular to TCP mounting.

The output connection terminals 4a of the chip 3 and the TAB tape 5 are respectively positioned on the panel 1 and connection substrate 7, respectively. The chip 3 with a TCP structure and the TAB tape 5 bridge the panel 1 and connection substrate 7. In this condition, the chip 3 is connected to the panel 1 and substrate 7 by the adhesive 6.

The input connection terminals 4b of the chip 3 are formed of, e.g., gold. A wiring provided on the TAB tape is formed of copper, but its portions contacting the terminals 4b are formed of tin. In this structure, the wiring and terminals 4b contacting each other can be bonded by ILB (Inner Lead Bonding). This, coupled with the fact that the wiring for feeding an input signal has low resistance, insures electrically stable connection. Further, the chip 3 is fixed in place by the adhesive 6.

In summary, it will be seen that the present invention provides an LCD having various unprecedented advantages, as follows. Because the LCD feeds signals to an IC chip via a low resistance wiring, it insures table signal feed and thereby realizes high definition image display with ease. Further, the LCD does not need an input conductive pattern customarily formed on a glass substrate. This saves a limited space available on the glass substrate, and therefore reduces the size and frame area of the glass substrate, implementing a large size multi-frame LCD panel. In addition, the overall weight of the LCD is reduced. Moreover, the LCD is inexpensive because it can feed input signals without resorting to an FPC board which is apt to be expensive.

Various modifications will become possible for those skilled in the art after receiving the teachings of the present disclosure without departing from the scope thereof.

What is claimed is:

1. In a liquid crystal display (LCD) comprising a liquid crystal (LC) panel including a glass substrate, and an IC (Integrated Circuit) chip having input connection terminals and output connection terminals and mounted on said glass substrate, said output connection terminals are directly mounted on said glass substrate while said input connection terminals are connected to a connection substrate, and said IC chip bridges said glass substrate and said connection substrate.

2. In an LCD comprising an LC panel including a glass substrate, and an IC chip having input connection terminals and output connection terminals and mounted on said glass substrate, said output connection terminals are directly mounted on said glass substrate while said input connection terminals are connected to a TAB (Tape Automated Bonding) tape, said TAB tape is connected to a connection substrate, and said IC chip bridges said glass substrate and said TAB tape.

\* \* \* \* \*